(12) United States Patent
Föhn

(10) Patent No.: US 9,631,729 B2
(45) Date of Patent: Apr. 25, 2017

(54) CLOSURE ELEMENT FOR A VALVE DEVICE AND VALVE DEVICE

(71) Applicant: GEMÜ Gebr. Müller Apparatebau GmbH & Co. Kommanditgesellschaft, Ingelfingen (DE)

(72) Inventor: Rene Föhn, Kriens (CH)

(73) Assignee: GEMÜ GEBR. MÜLLER APPARATEBAU GMBH & CO. KOMMANDITGESELLSCHAFT, Ingelfingen (DE)

( * ) Notice: Subject to any disclaimer, the term of this patent is extended or adjusted under 35 U.S.C. 154(b) by 69 days.

(21) Appl. No.: 14/467,909

(22) Filed: Aug. 25, 2014

(65) Prior Publication Data
US 2015/0053875 A1 Feb. 26, 2015

(30) Foreign Application Priority Data
Aug. 26, 2013 (DE) .......... 10 2013 216 956

(51) Int. Cl.
| F16K 7/12 | (2006.01) |
| F16K 27/02 | (2006.01) |
| F16K 35/02 | (2006.01) |
| F16K 7/14 | (2006.01) |

(52) U.S. Cl.
CPC ............ *F16K 7/12* (2013.01); *F16K 27/0236* (2013.01); *F16K 7/14* (2013.01); *F16K 35/02* (2013.01); *F16K 35/022* (2013.01)

(58) Field of Classification Search
CPC .......... F16K 7/12; F16K 7/14; F16K 27/0236; F16K 35/02; F16K 35/022; F16K 7/126
USPC ......... 251/61–61.5, 331, 77, 101; 137/15.18, 137/315.27; 99/96, 98 R, 99, 101; 92/96, 98 R, 99, 101
See application file for complete search history.

(56) References Cited

U.S. PATENT DOCUMENTS

| 2,615,177 A | * | 10/1952 | Schlichting | ............... A47K 1/14 251/297 |
| 3,874,630 A | * | 4/1975 | Novey | ................ F16K 17/0453 251/297 |
| 4,015,627 A | * | 4/1977 | Bower | .................. F16K 17/042 137/467 |

(Continued)

FOREIGN PATENT DOCUMENTS

| DE | 976108 | 2/1963 |
| DE | 1266079 | 4/1968 |

(Continued)

OTHER PUBLICATIONS

European Search Report issued in counterpart European patent application No. EP 14 17 5875 on Apr. 23, 2015.

(Continued)

*Primary Examiner* — Mary McManmon
*Assistant Examiner* — Richard K Durden
(74) *Attorney, Agent, or Firm* — Henry M. Feiereisen LLC

(57) ABSTRACT

A closure element for a valve device for fluids and a valve device for fluids is described. The closure element includes a membrane and a valve device protruding from the membrane. The valve device has an outer diameter recess which is configured so that the closure element can be locked by means of a locking slide which can be moved toward the outer diameter recess substantially orthogonally to a feed axis.

19 Claims, 9 Drawing Sheets

(56) References Cited

U.S. PATENT DOCUMENTS

| | | | | |
|---|---|---|---|---|
| 4,827,963 A | * | 5/1989 | Baker | ............... F16K 17/383 |
| | | | | 137/75 |
| 4,913,190 A | * | 4/1990 | Kugler | ............... F16K 11/0704 |
| | | | | 137/624.27 |
| 4,928,919 A | * | 5/1990 | Daicho | ............... F16K 1/302 |
| | | | | 251/278 |
| 6,007,045 A | | 12/1999 | Heiniger et al. | |
| 8,322,364 B2 | * | 12/2012 | Lacasse | ............... F16K 27/0281 |
| | | | | 137/270 |
| 2005/0035325 A1 | | 2/2005 | Balasubramanian | |
| 2012/0097880 A1 | | 4/2012 | Boettcher et al. | |

FOREIGN PATENT DOCUMENTS

| | | |
|---|---|---|
| DE | 21 24 485 | 12/1971 |
| DE | EP 0897076 A1 | 2/1999 |
| DE | 102008045857 A1 | 3/2010 |
| DE | 10 2011 080 139 | 1/2013 |
| GB | 941758 | 11/1963 |
| GB | 1 593 890 | 7/1981 |

OTHER PUBLICATIONS

English translation of European Search Report issued in counterpart European patent application No. EP 14 17 5875 on Apr. 23, 2015.

* cited by examiner

CLOSURE ELEMENT FOR A VALVE DEVICE AND VALVE DEVICE

CROSS-REFERENCES TO RELATED APPLICATIONS

This application claims the priority of German Patent Application, Ser. No. 10 2013 216 956.6, filed Aug. 26, 1014 pursuant to 35 U.S.C. 119(a)-(d), the disclosure of which is incorporated herein by reference.

BACKGROUND OF THE INVENTION

The invention relates to a closure element for a valve device and a valve device.

The following discussion of related art is provided to assist the reader in understanding the advantages of the invention, and is not to be construed as an admission that this related art is prior art to this invention.

So-called membrane valves, in which a drive region is separated from a fluid-conducting region by means of a membrane, are known.

It would be desirable and advantageous to provide an improved shutoff device which enables a space saving locking mechanism while at the same time simplifying the locking of a closure element.

SUMMARY OF THE INVENTION

According to one aspect of the present invention, a closure element for a valve device for fluids, includes a membrane; and a locking member protruding from the membrane, the locking member having an outer diameter recess, referred to hereinafter as an outer diameter return. Locking slides movable in a direction substantially orthogonal to a feed axis of the locking member are configured for engagement in the outer diameter return to thereby lock the locking member. This enables a space saving locking mechanism while at the same time simplifying the locking of the closure element.

According to another advantageous feature of the closure element according to the invention, the outer diameter return of the locking member is configured so that in an open state of the valve device a movement of a compressor, referred to hereinafter as a pressing part, of the valve device away from a valve seat of the valve device is transferable via the locking member to the membrane, which enables an easy detachment of the membrane from the valve seat.

According to another advantageous feature of the closure element according to the invention, the outer diameter return is configured so that in a closed state of the valve device a movement of the pressing part of the valve device toward the valve seat of the valve device is substantially not transferable to the membrane via the locking member. Thus during the pressing of the membrane onto the valve seat by means of the pressing part the locking member is not exposed to a load, which advantageously enables configuring the locking mechanism smaller. This allows on one hand reducing construction space and on the other hand avoiding damage to or destruction of the locking member.

According to another advantageous feature of the closure element according to the invention, the outer diameter return has two stop regions for the locking slides which are spaced apart from each other so that in a locked state the locking member and the pressing part are movable toward each other along a feed axis. As a result the pressing part can press onto the membrane without subjecting the closure element to load.

According to another advantageous feature of the closure element according to the invention, the outer diameter return has an inner guide region, which is configured so that in a locked state the closure element and the pressing part are movable relative to each other along a feed axis. The inner guide region advantageously enables using the locking slide for centering the closure element, while at the same time ensuring movability of the pressing part and the closure element relative to each other.

According to another advantageous feature of the closure element according to the invention, the locking member has two spaced-apart outer guide regions, which have a substantially same outer diameter. The spaced-apart arrangement of the outer guide regions advantageously improves a guiding in a cylindrical reception region for the valve device in the pressing part.

According to another advantageous feature of the closure element according to the invention, the outer diameter return is arranged between the two guide regions. This advantageously establishes a guide adjacent the locking, which in turn advantageously enables the small configuration of the locking mechanism and improves guiding of the locking member.

According to another advantageous feature of the closure element according to the invention, the outer diameter return is spaced apart from the membrane so that the locking slides in a locking region of the pressing part, which faces away from a pressing-on region of the pressing part, are displaceable from radially outwardly into a locked position in which they engage in the outer diameter return by means of a coupling socket which can at least in sections be guided via the pressing part. As a result the pressing-on region of the pressing part can be spaced apart from the locking region of the pressing part, which for example allows configuring the locking region independent of the pressing-on region of the pressing part.

According to another advantageous feature of the closure element according to the invention, the outer diameter return is circumferentially continuous. As a result the closure element can advantageously be mounted independent of the arrangement of the locking slides and an engagement of the locking slides for accomplishing the locking can always be ensured.

According to another advantageous feature of the invention, the locking member is made of a substantially non-deformable material. As a result a secure locking of the closure element can be guaranteed.

The valve device has locking slides in the pressing part, which by means of a coupling socket, which embraces the pressing part, can be displaced into a locking position in which they engage the locking member. The coupling socket thus advantageously simplifies the secure and fast locking of the closure element.

In an advantageous embodiment of the valve device, the locking slides are each displaceable by means of a spring element, which engages on the pressing part, into a locking position, which releases the locking member. With this the locked position can be achieved even when the valve device is slanted independent of a weight force acting on the valve device.

In an advantageous embodiment of the valve device the coupling socket, which embraces the pressing part, is fixed relative to the pressing part during operation of the valve device by means of a spring element which engages on the intermediate piece of the valve device. During operation of the valve device the coupling socket covers an outer sheath of the pressing part in the region of the locking slides. This enables a locking of the closure element in a simple manner.

In an advantageous refinement, the coupling socket which embraces the pressing part is fixed relative to the intermediate piece during a mounting of the closure element by means of a fastening device. During the mounting the coupling socket allows access to the outer surface of the pressing part in the region of the locking slides. The coupling socket thus ensures during mounting that the closure element can be easily removed from the pressing part.

In an advantageous embodiment, a distal end of the valve device, an inner surface of the coupling socket and a bearing for the locking slides are configured in accordance with each other so that the locking slides prior to contacting the distal end of the valve device retract from an inner space of the pressing part when the coupling socket is fixed relative to the intermediate piece, when a membrane of the closure element is fixed relative to the intermediate piece, and when The pressing part is moved in feed direction and at the same time and/or subsequently enter an outer space of the pressing part. This embodiment enables a compact configuration of the valve device, wherein damage to or even destruction of the valve device or of elements interacting with the valve device can be prevented.

In a further embodiment of the valve device, the locking slides are non-detachably supported in the pressing part orthogonal to the feed axis, wherein respectively one of the locking slides is greater in a direction orthogonal to the feed axis than a sheath thickness of the pressing part in the region of the respective locking slide. This embodiment also contributes to a compact construction.

In a further advantageous refinement of the valve device the locking slides each have rounded ends. Stop regions of the outer diameter return of the locking member for the first end of the respective locking slide correspond to inwardly tapered outer surfaces of a truncated cone. A lead-in region of the coupling socket for the second end of the respective locking slide corresponds to an inner surface of a truncated cone which is tapered in a direction opposite the feed direction. This prevents destruction or jamming and with this an adverse influence on the function of the locking slides. The stops thus also achieve a wear resistant configuration. The configuration of the lead-in region of the coupling socket ensures a secure locking of the closure element.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
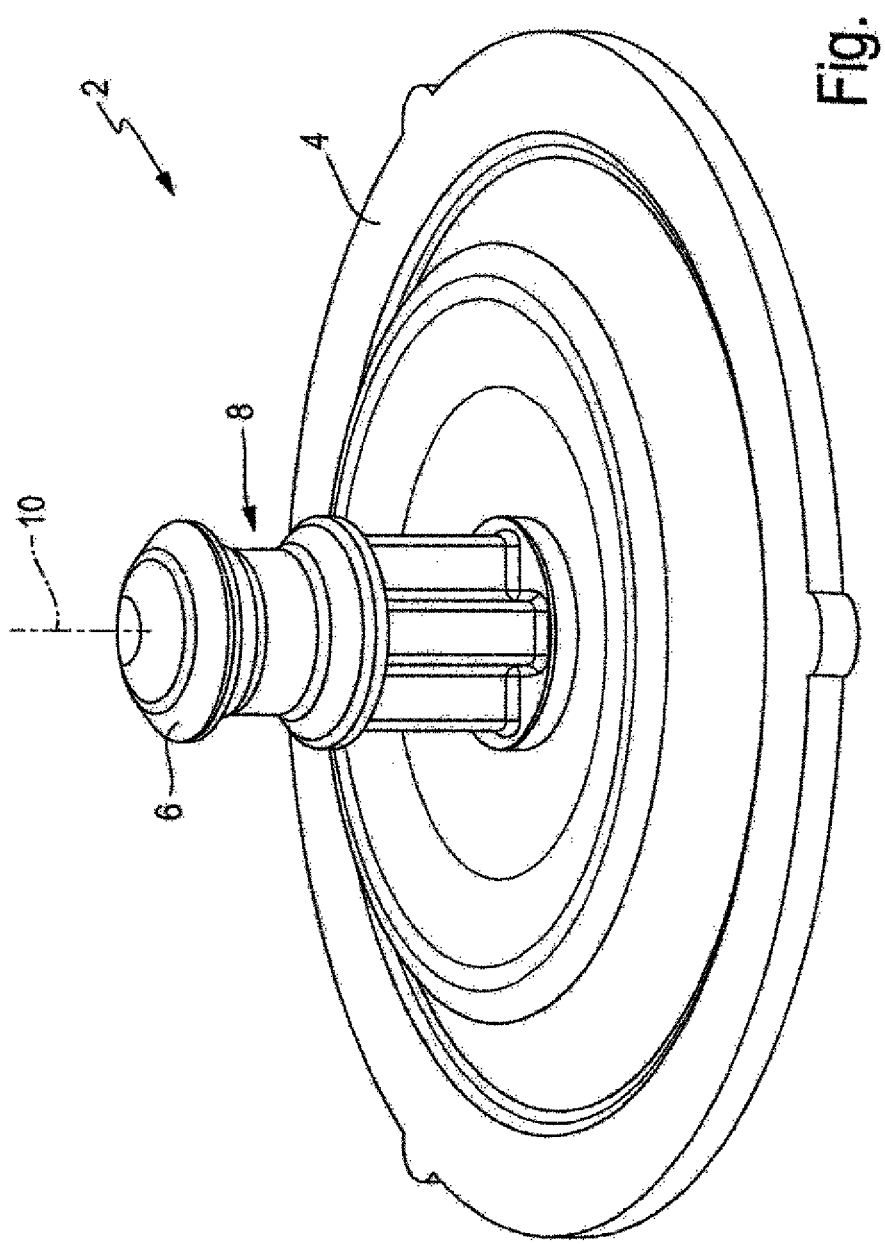
FIG. 1 a perspective view of a closure element.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view onto a closure element 2 for a valve device for fluids. The closure element 2 includes a membrane 4 and a locking member 6 protruding from the membrane 4. The locking member 6 is arranged centered relative to the membrane 4. The locking member 6 has an outer diameter return 8. The locking member 6 is made of a substantially non-deformable material for example a metal, a metal alloy or a thermoplastic material. In particular the locking member 6 is substantially non-deformable at an operating temperature of the valve device, in order to move the membrane 4 along a feed axis 10. The membrane 4 is configured for interacting with a valve body of the valve device.

Figure 2:
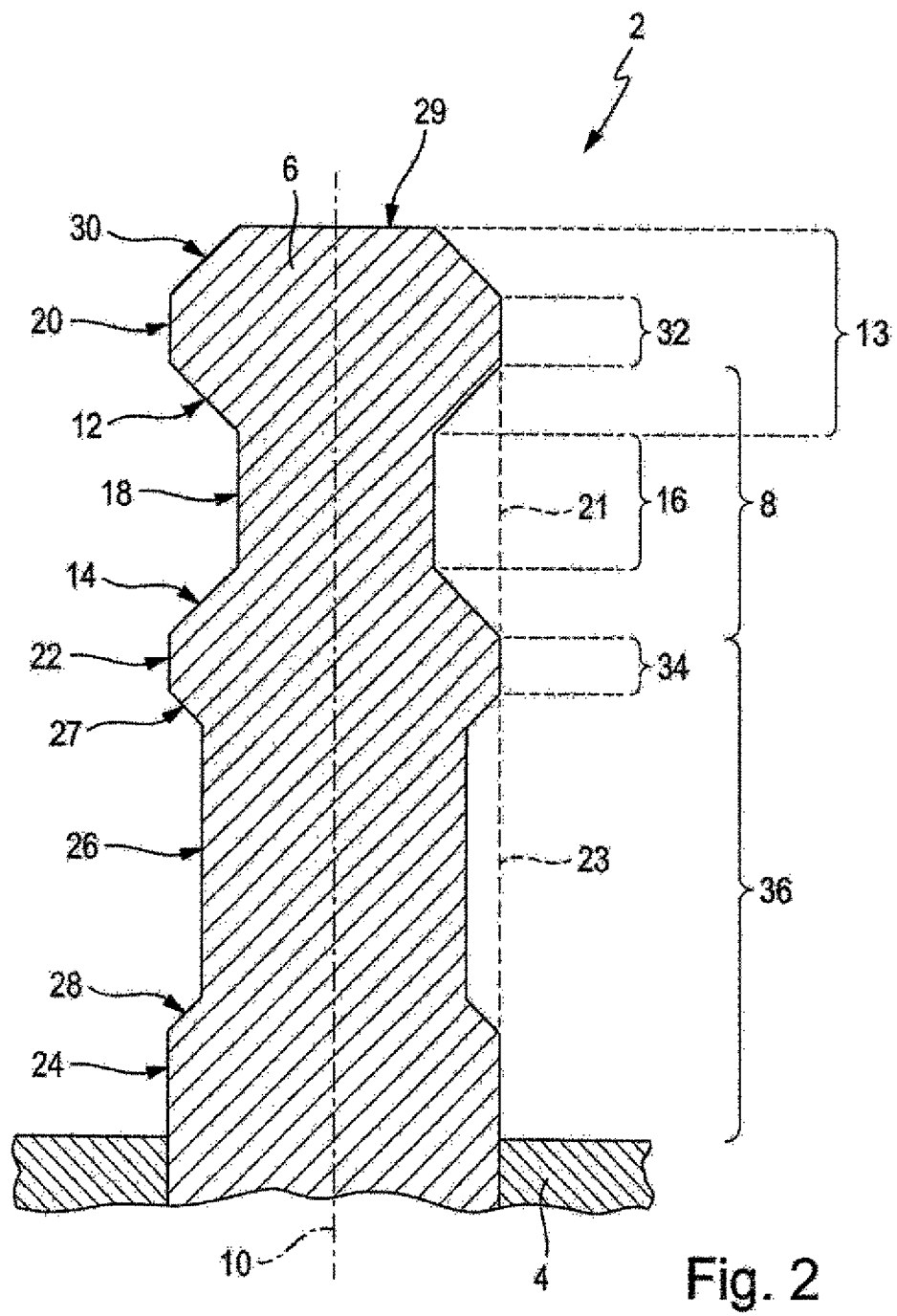
FIG. 2 a schematic sectional view of the closure element.

FIG. 2 shows a schematic sectional view through a part of the closure element 2, in particular through the protruding locking member 6. FIG. 2 also shows that the locking member 6 is arranged in the membrane 4, for example is molded together with the membrane 4. The outer diameter return 8 has a first stop region 12 toward the distal end 13 of the locking member 6. The outer diameter return 8 has a second stop region 14 toward the membrane 4. The stop regions 12 and 14 are spaced apart from each other via a distance 16 and are thus spaced apart so that in a locked state the locking member 6 and pressing part, which is explained below, can be moved relative to each other along the feed axis 10. The stop regions 12 and 14 of the outer diameter return 8 of the locking member 6 correspond to outer surfaces of truncated cones which are tapered toward each other.

The outer diameter return 8 has an inner guide region 18 which substantially corresponds to an outer cylinder surface which is oriented parallel to the feed axis 10. Further, the closure element 10 is configured substantially rotation symmetrical to the feed axis 10. Locking slides described in the following are displaceable to assume a locking position in which the locking slides engage the inner guide region 18 radially from outside. With this the locking member 6 is centered by means of the locking slides, i.e., it is supported along the feed axis 10. As a result the inner guide region 18 is configured so that in the locked state the closure element 2 and the pressing part 48 are movable relative to each other along the feed axis 10. The outer diameter return 8 is circumferentially continuous, i.e., continuous along the outer circumference. The outer diameter return 8 is thus provided for receiving the locking slides in their locking position. The locking member 6 has a first outer guide region 20 in the region of the distal end 13. Starting from the first outer guide region 18, a second outer guide region 22 adjoins the outer diameter return 8 toward the membrane 4.

A third guide region 24 adjoins a distance region 26 toward the membrane 4. The outer guide regions 20, 22 and 24 substantially have the same diameter, which is indicated with the dashed lines 21 and 23. In particular the outer diameter return 8 is arranged between the first guide region 20 and the second guide region 22. The outer guide regions 20, 22 and 24 correspond substantially to outer cylinder surfaces.

The distance region 26 tapers relative to the respective outer surface of the outer guide regions 20, 22 and 24 by way of the respective outer truncated cone surfaces 27 and 28 which taper toward the distance region 26.

The distal end 13 also has an end surface 29 and a lead-in region 30. The outer guide regions 20 and 22 are of the same size in the feed direction or parallel to the feed axis 10 and each have substantially the same height 32 and 34. The outer diameter return 8 is spaced apart from the membrane 4 by a distance 36.

Figure 3:
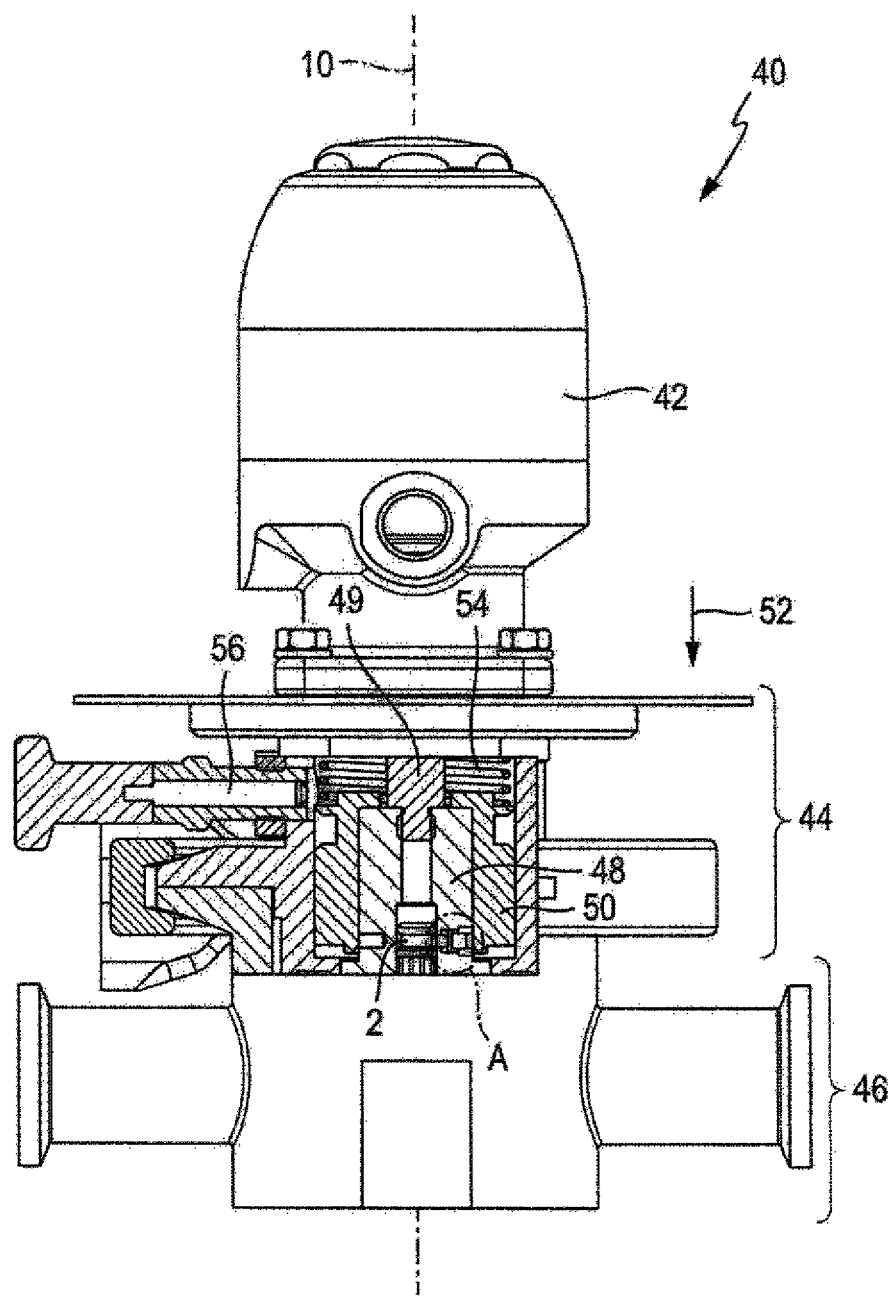
FIG. 3 a schematic side and sectional view of an valve device.

FIG. 3 shows a schematic side/sectional view of the valve device 40. Thee valve device 40 includes a not further described drive region 42 which is also referred to as drive, an intermediate piece 44 and a valve body 46. Located in the intermediate piece 44 is the pressing part 48 which is driven by the drive, wherein for this purpose the pressing part 48 is connected with the drive 42 via a drive rod 49. The pressing part 48 moves the closure element 2, which interacts with the valve body 46. The closure element 2 has the locking member 6 which protruded in the direction of the drive 42. FIG. 3 only shows a part of the locking member 6. In the direction of the valve body 46 the membrane 4 of the closure element 2 interacts with a valve seat of the valve body 46.

The pressing part 48 is embraced by a coupling socket 50. The coupling socket 50 is pushed in the feed direction 52 toward the valve seat onto the pressing part 48 by means of a spring element 44, which engages on the intermediate piece 44 of the valve device 40.

In the region of a section A, a locking slide is located in the sectional view, which is in a locked position. The locked position of the locking slide can be accomplished by means of the coupling socket 50 which embraces the pressing part 48. In the sectional view of FIG. 3 only one locking slide is shown. However, the valve device 40 includes at least two locking slides in order to engage the locking member 6. Preferably three locking slides are arranged in a plane orthogonal to the feed axis 10 in the pressing part 48, wherein the three locking slides are equidistantly spaced apart in circumferential direction, i.e., two respective same angles are formed between two neighboring locking slides. Further, the intermediate piece 44 has a rod 56 which is generally also referred to as fastening device and can be displaced orthogonally to the feed axis 10. By means of the rod 56 the coupling socket 50 can be fixed relative to the intermediate piece 44.

Thus, the pressing part 48 has at least two locking slides, which are displaceable by means of the coupling socket 50 which embraces the pressing part 48, to assume a locking position in which they engage the locking member 6, The valve device 40 is in particular configured so that the valve body 46 and also the closure element 2, i.e., all media-contacting parts of the valve device 40, can be exchanged in a simple manner. Therefore the valve device 40 can also be referred to as a single use valve device.

Figure 4:
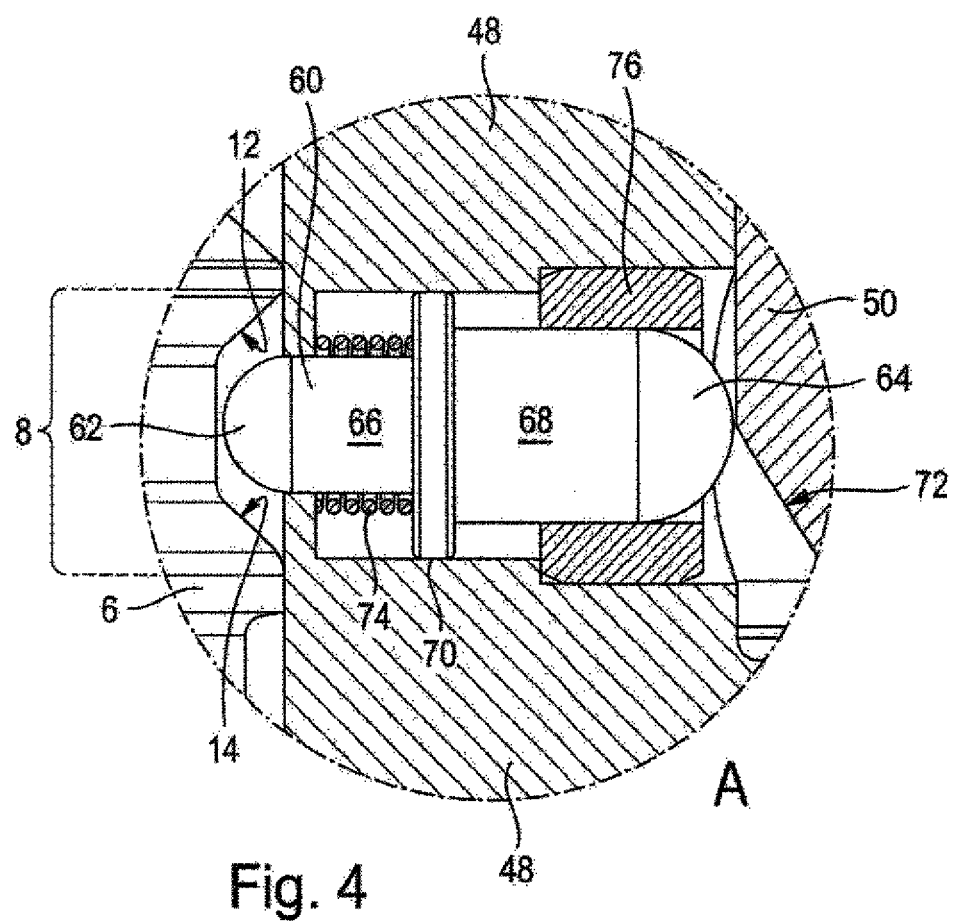
FIG. 4 a section from FIG. 3.

FIG. 4 shows the section A from FIG. 3. The locking slide 60 is located in the locking position, which locks the locking member 6. The locking slide 60 is received in the pressing part 48 so that the locking slide 60 is movable substantially orthogonally relative to the feed axis 10. The locking slide 60 has a first rounded end 62 and a second rounded end 64. The ends 62 and 64 are respective cylinder outer surfaces 66 and 68. Located between the cylinder outer surfaces 66 and 68 is a ring-shaped outer diameter protrusion 70. The stop region 12 of the locking member 6 is provided for the first end 62 of the locking slide 60. A lead-in region 72 of the coupling socket 50 is provided for the second end 64 of the locking slide 60. The lead-in region 72 of the coupling socket 50 corresponds substantially to an inner surface of a truncated cone which is tapered in a direction opposite the feed direction 52.

The locking slide 60 is securely supported orthogonally to the feed direction 10. A spring element 74 is arranged between the pressing part 48 and the annular outer diameter protrusion 70 so that the locking slide 60 is always impinged with a force which acts radially outwardly relative to the feed axis 10 in order to displace the locking slide 60 in the unlocked position when the second end 64 is unblocked. Orthogonally to the feed axis 10 the locking slide 60 is greater than a sheath thickness of the pressing part 48 in the region of the locking slide 60. By means of a ring body 76, which is introduced with a press fit into the pressing part 48, the locking slide 60 is securely supported in the pressing part 48. The outer diameter return 8 of the locking member 6 is configured so that the closure element 2 is lockable by the locking slides 60 which are movable toward the outer diameter return 8 substantially orthogonally to the feed axis 10.

Figure 5:
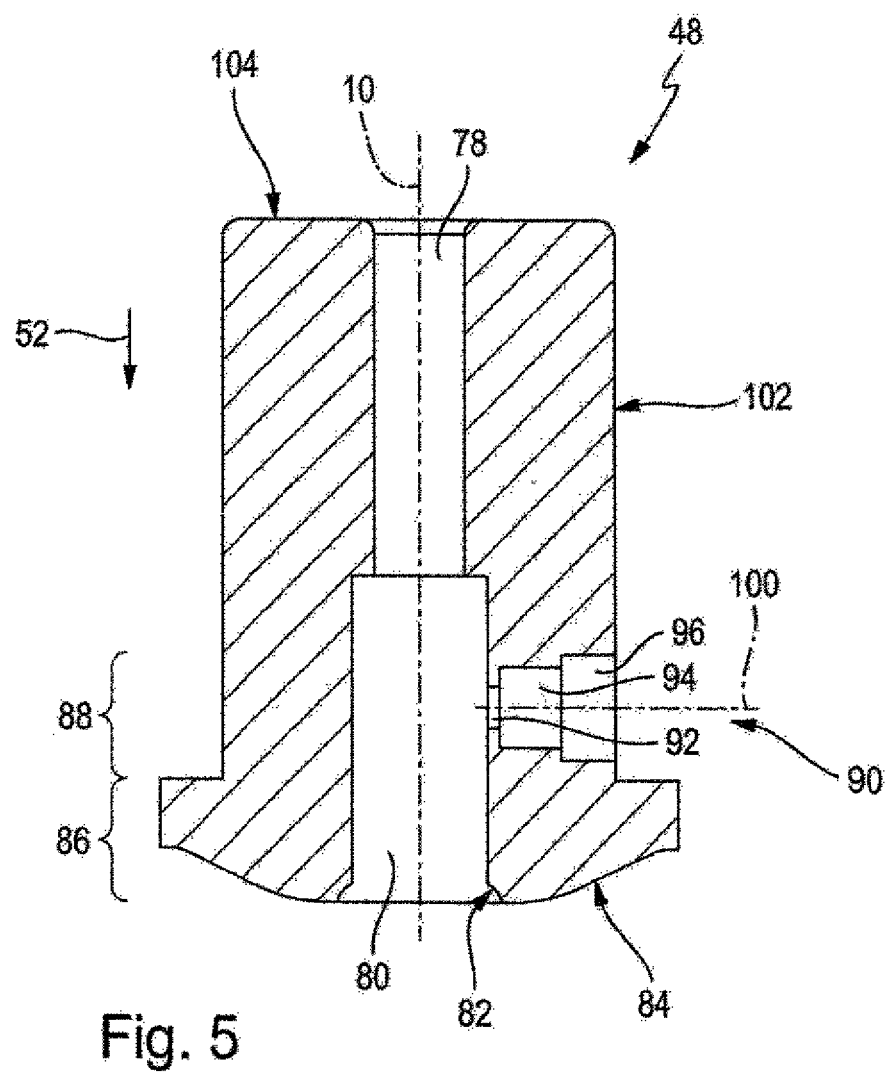
FIG. 5 a schematic sectional view of a pressing part.

FIG. 5 shows a schematic sectional view of the pressing part 48, which is substantially configured rotation symmetrically to the feed axis 10. A first cylindrical recess 78 is provided for receiving the drive rod 49. The drive rod 49 can for example be fixed relative to the pressing part 48 by means of a press fit. A second substantially cylindrical recess 80 is provided for receiving the locking member 6 of the closure element 2. The recess 80 includes a lead-in region 82 which can for example be configured in the shape of the inner surface of a truncated cone. Adjoining the lead-in region 82 radially outwardly is a pressing region 84. The pressing region 84 is provided to move the membrane 4 toward the valve seat and to press it against the valve seat. The pressing region 84 is part of a mushroom head shaped region 86. Adjoining the region 86 in opposite direction to the feed direction is a locking region 88. The locking region 88 includes a through passage 90 for receiving the locking slide 60. The pressing part 48 includes further through passages 90 corresponding to the number of the locking slides 60. The first end 62 of the locking slide 60 is guided through a recess 92 shaped as an inner cylinder surface. A recess 94 shaped as an inner cylinder surface serves for guiding and receiving the annular outer diameter protrusion 70. A recess 96 shaped as an inner cylinder surface serves for receiving the ring body 76 by means of a press fit. Of course other ways for securely guiding the locking slide along a displacement axis 100 are possible. The displacement axis 100 extends orthogonally to the feed axis 10.

Starting from the region 86, the pressing part 48 is tapered in a direction opposite the feed direction 52 and has a substantially cylindrical outer surface 102, over which the coupling socket 50 can be guided at least in regions. The coupling socket 50 can be guided up to the locking region 88 or past the locking region 88 in order to displace the locking slide or locking slides 60 in the locking region 88, which faces away from the pressing region 84 of the pressing part 48, from radially outwardly into a locking position in which the locking slide(s) engage in the outer diameter return 8. For this displacement the outer diameter return 8 is spaced apart from the membrane 4, in order to be guidable along the feed axis 10 into the recess 80 up to the opening 92. By means of the sheath surface 102 the pressing part 48 can enter into the coupling socket 50 against the feed direction 52.

In a direction opposite the feed direction 52 the pressing part 48 has a stop region 104 for the coupling socket 50. The coupling socket 50 can abut the stop region 124 in feed direction 52 by means of the spring, element 54 which enables fixing of the coupling socket 50 relative to the pressing part 48 by means of the spring element 54 and the stop region 104 when the drive rod 49 is moved.

Figure 6:
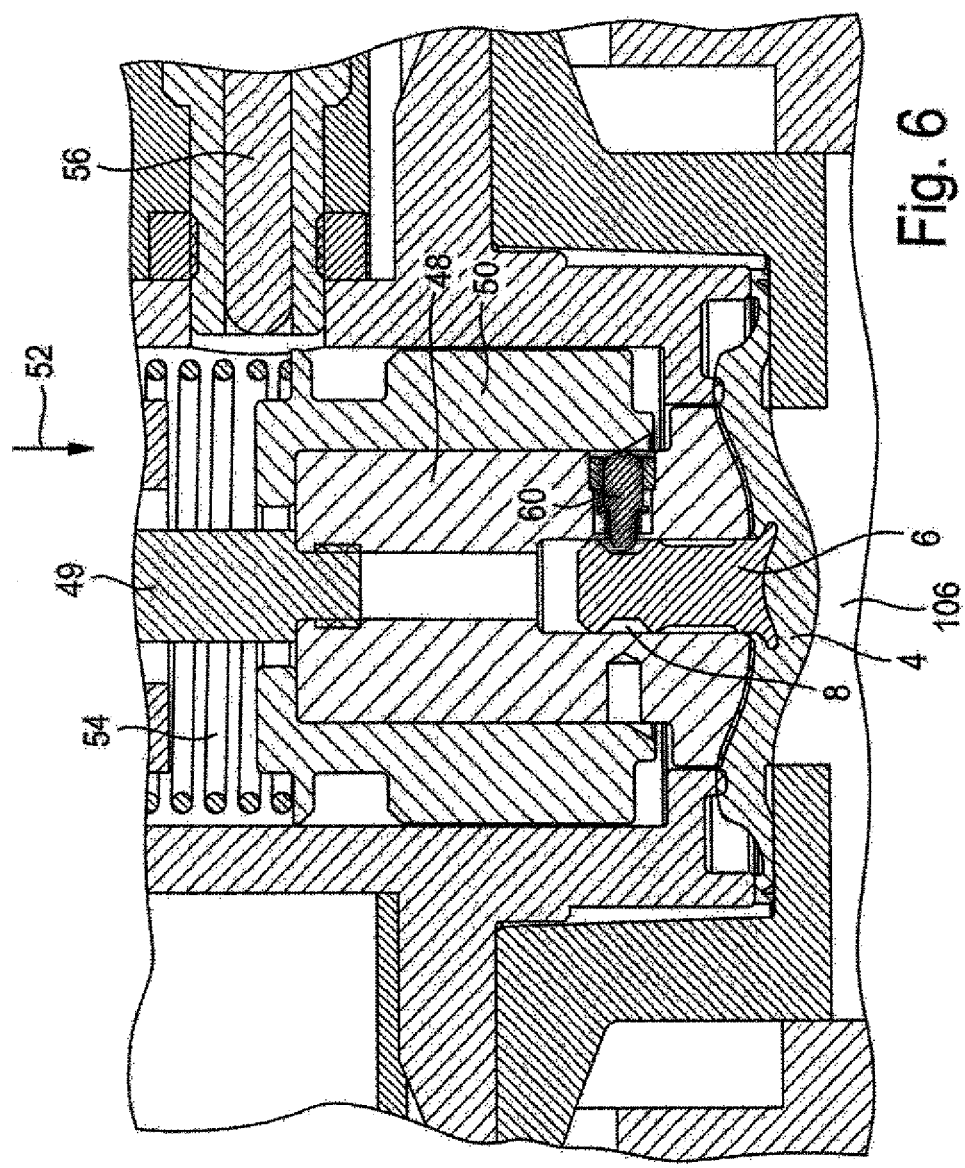
FIG. 6 a schematic sectional view of a part of the valve device in a closed state.

FIG. 6 shows a part of the valve device 40 in a closed state. In a region 106, which is not further shown, the membrane 4 pushes the closure element 2 onto the valve seat and thereby closes the valve device. For this the pressing part 48 is impinged with force in feed direction 52 via the drive rod 49. Via the pressing region 84 the pressing part 48 presses onto the membrane 4 in correspondence with the exerted force. The membrane 4 includes a flexible material causing the membrane to decrease its thickness along or parallel to the feed axis 10. The locking elements 60 are moved toward the outer diameter return 8 and are therefore located in the locked state. As shown in FIG. 6 the first end 62 of the locking slide 60 engages in the outer diameter return 8, however it does not rest against one of the two stop regions 12 or 14. The distance 16 ensures thus that in the closed state of the valve device 40 a movement of the pressing part 48 toward the valve seat of the valve device 2 can substantially not be transferred to the membrane 4 via the locking member 6.

Figure 7:
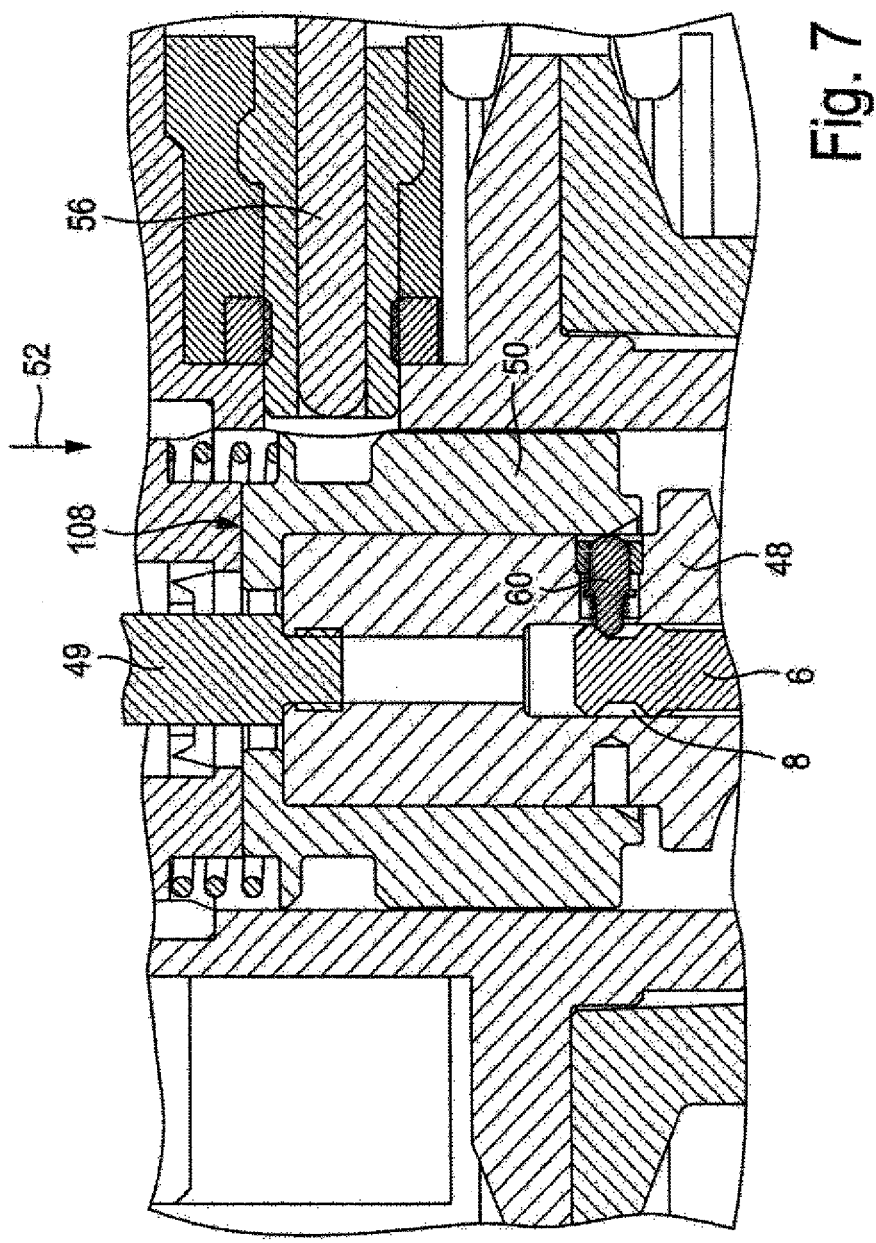
FIG. 7 a schematic sectional view of the part of the valve device in an opened state.

The closed state shown in FIG. 6 and the subsequent opened state shown in FIG. 7 illustrate an operation of the valve device 40. During the operation of the valve device 40 the coupling socket 50, which embraces the pressing part 48, is fixed relative to the pressing part 48 by means of the spring element 54 which for example engages on the intermediate piece 44. During the operation of the valve device 40 the locking slides 60 are in a locked state in order to lock the locking member 6. During the operation of the valve device the coupling socket 50 covers the outer sheath 102 of the pressing part 48 in the region of the locking slide 60.

FIG. 7 shows the part of the valve device 40 in the open state. In the open state the drive rod 49 is retracted against the feed direction 52. Correspondingly the pressing part 48 is also retracted and opens via the locking member 6 the valve device 40 because in the open position the membrane 4 is or will be removed form the valve seat.

The locking slide 60 engages in the outer diameter return 8 on the first stop 12 and with this pulls the locking member 6 and with this the entire closure element 2 in a direction against the feed direction 52 in order to open the valve device 40. With this the outer diameter return 8 is configured so that in the open state of the valve device 40 a movement of the pressing part 48 away from the valve seat is transferable to the membrane 4. An upper stop region 108 of the intermediate piece 44 defines the upper position shown in FIG. 7 in which the coupling socket 50 rests against the stop region 108.

In a further embodiment of the closure element 2 the outer diameter return 8 can be configured so that in the open state of the valve device 2 a movement of the membrane 4 away from the valve seat against the feed direction 52 is transferable to the pressing part 48 via the locking member 6. For this the second stop region 14 can rest against the end 62 of the locking member 60.

Figure 8:
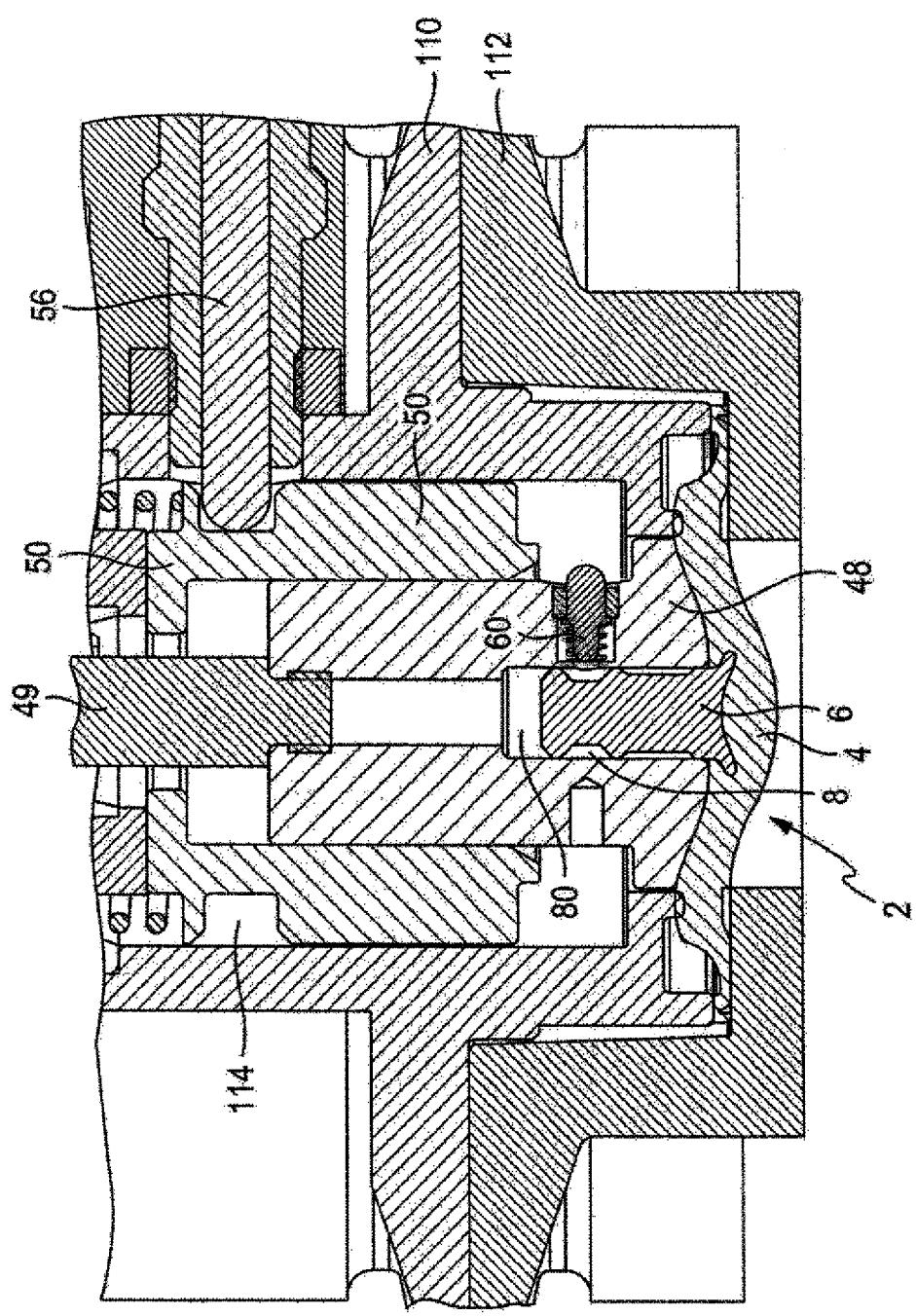
FIG. 8 a schematic sectional view of the part of the valve device in an unlocked state.

FIG. 8 shows a schematic sectional view of the part of the valve device 40 in a unlocked state during mounting. In the unlocked state the coupling socket 50 releases a radially outer region of the pressing part 48 for the locking slide 60 in which the locking slide 60 enters due to the radially outwardly acting force exerted by the spring element 74. The locking slide 60 is thus moved out of the outer diameter return 8 of the locking member 6 and with this out of the recess 80. In order to remove the closure element 2, a clamping of the membrane 4 between the elements 110 and 112 is released, thus enabling to remove the locking member 6 from the recess 80 of the pressing part 48. Subsequently a new closure element 2 can be brought into the position shown in FIG. 8 again by clamping the membrane 4 of the new closure element 2 between the elements 110 and 112.

During mounting of the closure element 2 the coupling socket 50 is fixed relative to the intermediate piece 44 by means of the rod 56. For this the rod 56 engages in a recess 114 of the coupling socket 50 provided therefore, which is configured substantially rotation symmetrical to the feed axis 10. The coupling socket 50, which is fixed by means of the rod 56, provides access during mounting to the outer sheath 102 of the pressing part 48 in the region of the locking slide 60.

Figure 9:
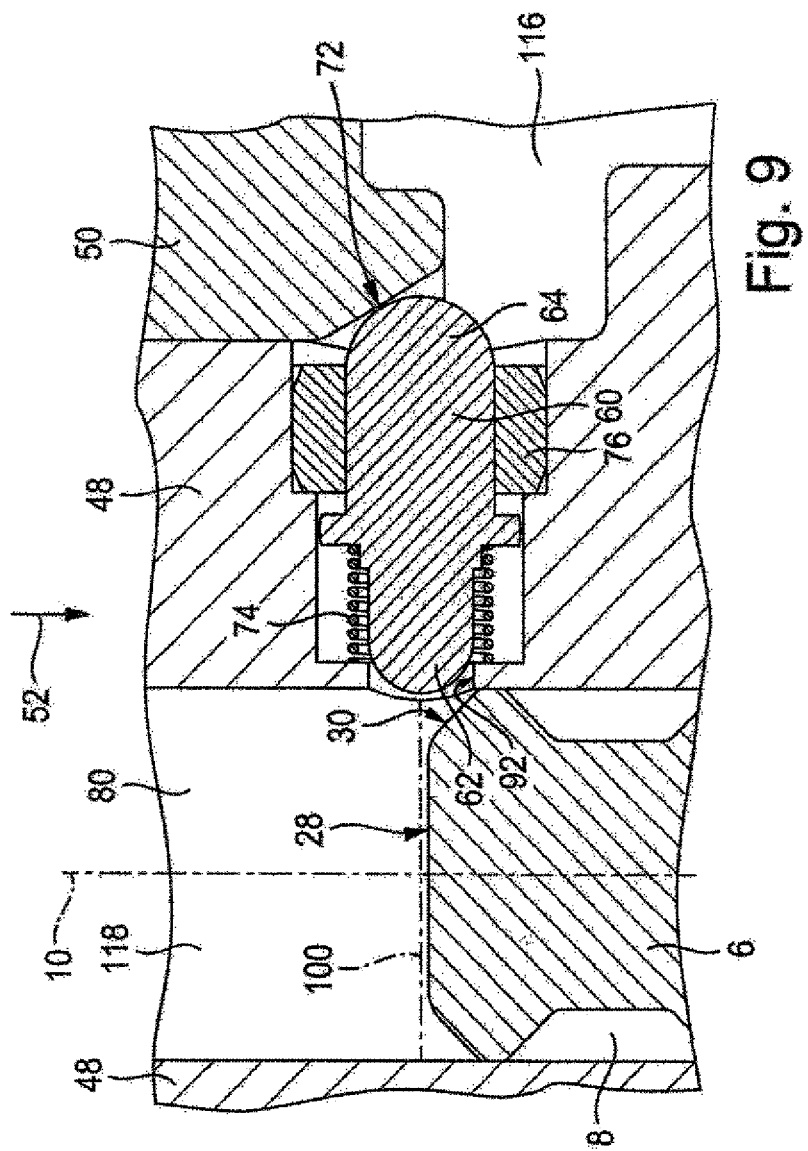
FIG. 9 a schematic sectional view regarding a mounting step form the closure element.

FIG. 9 shows a schematic sectional view of a part of the valve device 40 in a mounting step. The distal end 13 has a truncated cone-shaped lead-in region 30 which in a preferred embodiment is not contacted during the mounting and during operation of the locking slide 60. For this the distal end 13 is not configured cylindrical in the region of the lead-in region 30 but in the manner of a truncated cone which corresponds to a recess which leaves the first end 62 of the locking slide 60 free in the region for the first end 62. The coupling socket 50 has the lead-in region 72, which provides access to a region for the second end 64 of the locking slide. A support for the locking slide 60 is configured so that the locking slide 60 can move along the displacement axis 100.

During mounting in the mounting step shown in FIG. 9, the coupling socket 50 is fixed relative to the intermediate piece 44. Further, the membrane 4 is clamped between the elements 110 and 112 and with this also fixed relative to the intermediate piece 44. Depending on the flexibility of the membrane 4 and the weight force acting on the closure element 4, the locking member 6 is in the position shown in FIG. 9. The distance 16 of the outer diameter return 8 thus also facilitates the locking because the distance 16 provides a tolerance region for the locking slides. In the mounting step shown in FIG. 9 the pressing part 48 is moved in the feed direction 52. Due to the fact that the spring element 64 pushes the locking slide 60 radially outwardly relative to the feed axis 10, in the shown state the second end 64 pushes on the lead-in region 72.

At the same time the first end 62 of the locking slide 60 enters into the opening 92. When the pressing part 48 is further moved in the feed direction 52, the locking slide 60 enters into an outer space 116 of the pressing part 48.

With this, the distal end 13 of the locking member 6, an inner surface of the coupling socket 50 and a support for the locking slide 60 are configured in correspondence to each other so that the locking slide 60 retracts out of the interior space 118 or out of the recess 80 when the coupling socket 54 is fixed relative to the intermediate piece 44, when the membrane 4 of the closure element 2 is fixed relative to the intermediate piece 44 and when the pressing part 48 is moved in the feed direction 52, and at the same time and or subsequently enters into the outer space 116.

For mounting a new closure element the drive is moved into the open position as shown in FIG. 7. In a following step the rod 48 of the coupling socket 50 is moved toward the coupling socket 50 and the coupling socket 50 thus fixed relative to the intermediate piece 44. Subsequently in the case the closure element 2 is to be exchanged, the old closure element 2 is removed. The membrane 4 of the new closure element 2 is fixed relative to the intermediate piece 44, and the locking member 6 is inserted in the recess 80 or the pressing part 48. Subsequently the pressing part 48 is moved into the closed position shown in FIG. 8 by means of the drive rod 49, in which the displacement axis 100 is located in the region of the outer diameter return 8 of the locking member 6. In the following step the fastening device can be released, i.e., the rod 56 is moved radially outwardly, whereby the coupling socket 50 is moved in the feed direction 52 due to gravity. By means of spring force the coupling socket 50 contacts with its lead-in region 72 the second end 64 and displaces the locking slide(s) 60 in the locking position in which they engage in the outer diameter return 8.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A closure element for a valve device for fluids, the closure element comprising:
    a membrane; and
    a locking member protruding from the membrane, said locking member having an outer diameter recess;
    wherein the outer diameter recess has a stop region toward a distal end of the locking member;
    wherein the outer diameter recess is configured to lock the locking member by means of engaging locking slides in the outer diameter recess;
    wherein the locking slides are movable in a direction substantially orthogonal to a feed axis of the locking member;
    wherein the outer diameter recess is spaced apart from the membrane so that the locking slides are displaceable by a coupling socket in a locking region of a compressor from radially outwardly into a locking position in which the locking slides engage in the outer diameter recess;
    wherein the compressor comprises a pressing region to move said membrane toward a valve seat and to press the membrane against said valve seat;
    wherein the locking region faces away from the pressing region of the compressor, and wherein the coupling socket embraces the compressor to displace the locking slides so that the locking slides assume the locking position in which the locking slides engage in the outer diameter recess; and
    wherein the locking slides engage in the outer diameter recess on the stop region in order to pull the locking member and the entire closure element by means of the locking slides in a direction away from the valve seat in order to open the valve device.

2. The closure element of claim 1, wherein the closure element is configured so that in an open state of the valve device a movement of the compressor away from a valve seat of the valve device is transferable to the membrane via the locking member.

3. The closure element of claim 1, wherein the closure element is configured so that in a closed state of the valve device a movement of the compressor toward a valve seat of the valve device is substantially not transferable to the membrane via the locking member.

4. The closure element of claim 1, wherein the outer diameter recess has two stop regions for the locking slides, said stop regions being spaced apart from each other so that in a locked state of the valve device, the closure element and the compressor are movable relative to each other along the feed axis.

5. The closure element of claim 1, wherein the outer diameter recess has an inner guide region, which is configured so that in the locked state the closure element and the compressor are movable relative to each other along the feed axis.

6. The closure element of claim 1, wherein the locking member has two spaced-apart outer guide regions which have a substantially same outer diameter.

7. The closure element of claim 6, wherein the outer diameter recess is arranged between the two guide regions.

8. The closure element of claim 1, wherein the outer diameter recess is configured continuous along a circumference of the locking member.

9. The closure element of claim 1, wherein the locking member is made of a material which is substantially non-deformable at an operating temperature of the valve device.

10. The closure element of claim 9, wherein the material includes a member selected from the group consisting of a metal, a metal alloy and a thermoplastic material.

11. A valve device for fluids, comprising:
    a drive;
    an intermediate piece;
    a valve body comprising a valve seat;
    a closure element interacting with the valve body and having a membrane and a locking member, wherein the locking member protrudes from the membrane in a direction of the drive;
    a compressor arranged in the intermediate piece and moving the closure element, said compressor comprising at least two locking slides and being driven by the drive, wherein the compressor comprises a pressing region to move the membrane toward the valve seat and to press the membrane against the valve seat; and
    a coupling socket arranged in the intermediate piece, the coupling socket embracing the compressor and being movable relative to the compressor, said locking slides being displaceable by means of the coupling socket into a locking position in which the locking slides engage the locking member.

12. The valve device of claim 11, further comprising a spring element engaging on the compressor, wherein the locking slides are each displaceable by the spring element into an unlocked position in which the locking slides release the locking member.

13. The valve device according to claim 11, wherein the coupling socket is fixed relative to the compressor during an operation of the valve device, and wherein the coupling socket during operation of the valve device covers an outer sheath of the compressor in a region of the locking slides.

14. The valve device of claim 13, wherein the coupling socket is fixed relative to the compressor by means of a spring element which engages on the intermediate piece of the valve device.

15. The valve device of claim 11, further comprising a fastening device which fastens the coupling socket during a mounting of the closure element relative to the intermediate piece, wherein the coupling socket during the mounting releases an outer sheath of the compressor in a region of the locking slides.

16. The valve device of claim 11, wherein the locking slides, a distal end of the locking member, an inner surface of the coupling socket and a support for the locking slides are configured in correspondence to each other so that the locking slides, prior to contacting the distal end of locking member, retract from an interior space of the compressor and simultaneously and/or subsequently enter into an outer space of the compressor when the coupling socket is fixed relative to the intermediate piece, the membrane of the closure element is fixed relative to the intermediate piece and when the compressor is moved in a feed direction.

17. The valve device of claim 11, wherein the locking slides are captively supported in the compressor orthogonally to the feed axis, and wherein a respective one of the locking slides is dimensioned greater orthogonally to a feed axis than a sheath thickness of the compressor in a region of the respective locking slide.

18. The valve device of the claim 11, wherein the locking member has an outer diameter recess for receiving the locking slides in their locking position.

19. The valve device of claim 18, wherein the locking slides each have rounded first and second ends, wherein the outer diameter recess of the locking member has stop regions for the first end, each of said stop regions corresponding in shape to outer surfaces of a truncated cone which extend toward each other, and wherein the coupling socket has a lead-in region for the second end of the respective locking slide, said lead-in region corresponding in shape to an inner surface of a truncated cone which tapers in a direction opposite a feed direction.

* * * * *